(No Model.)

J. L. LAW, Jr.
PACKING.

No. 374,796. Patented Dec. 13, 1887.

WITNESSES:
A. Faber du Faur Jr.
William Miller

INVENTOR
Jesse L. Law Jr.
BY Van Santvoord & Hauff
his ATTORNEYS

UNITED STATES PATENT OFFICE.

JESSE L. LAW, JR., OF NEW YORK, N. Y.

PACKING.

SPECIFICATION forming part of Letters Patent No. 374,796, dated December 13, 1887.

Application filed September 15, 1887. Serial No. 249,782. (No model.)

*To all whom it may concern:*

Be it known that I, JESSE L. LAW, Jr., a citizen of the United States, residing at New York, in the county and State of New York, have invented new and useful Improvements in Packing for Steam and other Machinery, of which the following is a specification.

The object of my invention is to produce an improved packing for engines, pumps, and other machinery where packing is employed; and the mode of carrying out my invention and applying the same to use is particularly described hereinafter, reference being had to the accompanying drawings, in which—

Figure 1:
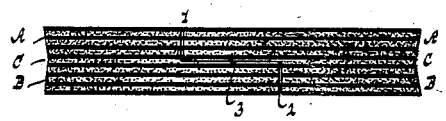
Figure 2:
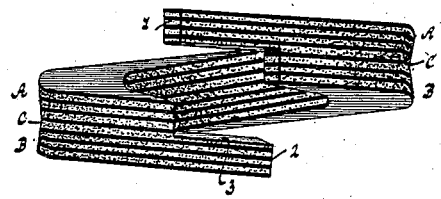
Figure 3:
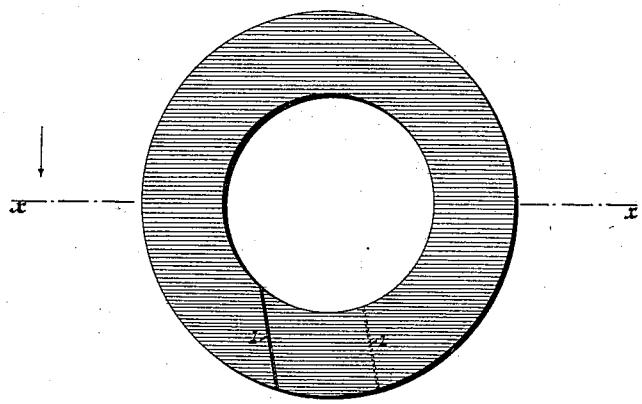
Figure 4:
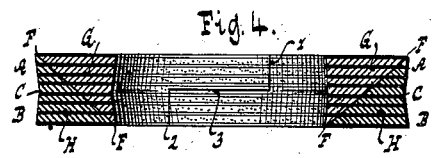
Figure 5:
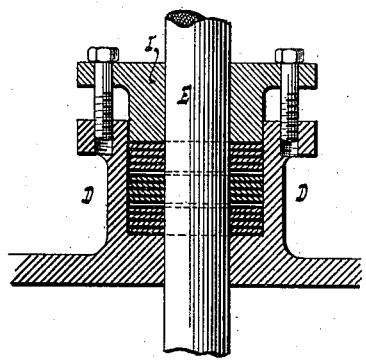

Figure 1 is an outside or edge view of a packing-ring for a piston-rod made according to my invention. Fig. 2 is a perspective view of said ring when opened ready to be placed upon a piston-rod. Fig. 3 is a plan view of the ring, Fig. 1. Fig. 4 is a vertical cross-section in the line $x\ x$, Fig. 3. Fig. 5 shows my improved packing applied in a stuffing-box of a piston-rod.

Similar letters indicate corresponding parts.

In carrying out my invention I take talc in a powdered condition and india-rubber, the latter in solution, and mix them thoroughly together in the proportion of about ten pounds of powdered talc to about thirty pounds of ordinary india-rubber solution. I then prepare duck or other similar fabric in sheets or layers of convenient size and coat the surfaces thereof with the said mixture in any convenient manner, laying up the layers of duck one upon another, each layer being coated with the mixture, so that the coating and the duck alternate with each other, until the desired thickness is obtained for the packing.

I ordinarily use about from seven to ten layers of duck for the purpose; but I do not restrict myself to those numbers. I then saturate these combined layers of talc, rubber, and duck with a composition of talc, black-lead, mineral oil, and castor-oil (glycerine can be used in place of castor-oil) in the following proportions, namely: ground or powdered talc, about five pounds; black-lead, about twelve pounds; ordinary mineral oil, about four gallons; castor-oil, (or glycerine,) about one gallon. These ingredients are mixed thoroughly together and placed in a closed vessel, into which the combined layers of duck, talc, and rubber are placed, and the whole subjected to heat and pressure, so as to force the last-named composition into the duck fabric until the duck is well saturated therewith, the heat being carried up to about 170° Fahrenheit and maintained thereat for about three-quarters of an hour. The combined layers of duck, talc, and rubber thus saturated form a blank, from which I make the packing-rings of any desired form or size by cutting the same into proper form with any convenient machine or tool—as, for example, by means of an ordinary drill-press.

In cutting out the packing into the desired form I hold the cutter at an angle with the surface of the material and cut down about half-way through the thickness of the blank on an inclination, as indicated by the line marked A in Fig. 1 and in Fig. 4, and then reverse the position of the blank and submit the opposite surface to the action of the cutter, inclining the cutter, as before, so as to produce an inclined cut in the reverse direction, as indicated by the line B in Fig. 1 and in Fig. 4, thereby producing a grooved surface on the outer and inner walls of the packing-ring, as is shown in the drawings. The grooves thus formed are indicated by the letter C, and the object of forming them there is to provide at those places receptacles for oil or lubricating material for lubricating the piston or valve rod or stem as they pass through the packing, and for lubricating the surface of the stuffing-box and keeping the packing from sticking when it is desired to remove it. The oil or lubricating material will pass from the duck to the grooves in sufficient quantity to supply the grooves.

For the purpose of enabling the packing-ring to be placed on a piston-rod or valve-stem without removing the cross-head, I split the ring, in the manner indicated in Figs. 1 to 4, by cutting therein the nearly-vertical cuts 1 2 from the opposite surfaces, and then making in it the horizontal cut 3, which extends from the upper cut, 1, to the lower cut, 2. The cuts 1 2 form shoulders, which, by interrupting the direction of the line on which the ring is divided, hinder the passage of steam or other vapor or fluid from one side of the ring to the other through the line of division of the ring.

The plan view, Fig. 3, shows the upper cut, 1, and also by dotted line indicates the lower cut, 2.

In Fig. 5 I have shown a stuffing-box, D, provided with three packing-rings, and a piston-rod, E, passing through the rings.

Fig. 4 is an illustration of a modified form of packing-ring produced by splitting the ring on the bevel-line F, so that separately each is triangular in cross-section, and when one is set inside of the other they form a ring with flat surfaces. The object in this construction is to force the inner surface of the upper segment, G, of the ring inwardly against the rod E and the outer surface of the lower segment, H, outwardly against the stuffing-box by slight pressure on the gland I.

My improved packing is suitable for steam-packing, and also for water, ammonia, and crude oil.

What I claim as new, and desire to secure by Letters Patent, is—

1. A packing for steam-engines or other similar purposes, constructed with alternate layers of duck and coatings of talc and india-rubber saturated with a composition of talc, black-lead, mineral oil, and castor-oil, (or glycerine,) substantially as described.

2. A split packing having shoulders 1 2 and a connecting-cut, 3, and provided on its outer and inner walls with grooves C, substantially as described.

3. A packing-ring constructed in triangular segments G H, provided with shoulders 1 2 and a connecting-cut, 3, and having its inner and outer walls grooved, substantially as described.

In testimony whereof I have hereunto set my hand and seal in the presence of two subscribing witnesses.

JESSE L. LAW, Jr. [L. S.]

Witnesses:
J. VAN SANTVOORD,
E. F. KASTENHUBER.